(12) United States Patent
Wang et al.

(10) Patent No.: US 12,098,948 B2
(45) Date of Patent: Sep. 24, 2024

(54) METHOD FOR MEASURING ENERGY EFFICIENCY OF A QUANTITATIVE WEIGHING DEVICE

(71) Applicants: Mettler-Toledo (Changzhou) Precision Instruments Co., Ltd, Changzhou (CN); Mettler-Toledo (Changzhou) Measurement Technology Co., Ltd, Changzhou (CN); Mettler-Toledo International Trading (Shanghai) Co., Ltd, Shanghai (CN)

(72) Inventors: Shenhui Wang, Changzhou (CN); Qi Wan, Changzhou (CN); JingKe Wang, Changzhou (CN); Yu Zhang, Changzhou (CN); YuPeng Zhao, Changzhou (CN)

(73) Assignees: Mettler-Toledo (Changzhou) Precision Instruments Co., Ltd, Changzhou (CN); Mettler-Toledo (Changzhou) Measurement Technology Co., Ltd, Changzhou (CN); Mettler Toledo International Trading (Shanghai) Co., Ltd, Shanghai (CN)

( * ) Notice: Subject to any disclaimer, the term of this patent is extended or adjusted under 35 U.S.C. 154(b) by 496 days.

(21) Appl. No.: 17/445,233

(22) Filed: Aug. 17, 2021

(65) Prior Publication Data

US 2022/0057253 A1  Feb. 24, 2022

(30) Foreign Application Priority Data

Aug. 20, 2020  (CN) .......................... 202010842423.3

(51) Int. Cl.
*G01G 13/04* (2006.01)
*B65B 57/20* (2006.01)
(Continued)

(52) U.S. Cl.
CPC ........... *G01G 23/01* (2013.01); *G01G 13/003* (2013.01); *G01G 13/04* (2013.01); *B65B 57/20* (2013.01); *G01G 19/414* (2013.01)

(58) Field of Classification Search
CPC ...... G01G 13/003; G01G 13/04–13/10; G01G 19/414; G01G 23/01; B65B 57/20
See application file for complete search history.

(56) References Cited

U.S. PATENT DOCUMENTS 4,766,966 A * 8/1988 Nagao ................ G01G 13/2918
  177/123
6,502,013 B1 * 12/2002 Sosnik ................... G01G 13/06
  177/121

(Continued)

*Primary Examiner* — Randy W Gibson
(74) *Attorney, Agent, or Firm* — Standley Law Group LLP; Jeffrey S. Standley; Adam J. Smith

(57) ABSTRACT

A method is provided for measuring an energy efficiency of a quantitative weighing device. A data measurement part is formed by: recording a control time of fast charging, recording a control time of slow charging, recording a comparison prohibition time, and recording weighing data. A current device reliability parameter, a fast charging feed flow, and a slow charging feed flow are calculated, based on the comparison prohibition time and the control time of slow charging. The fastest feed time under a requirement of a target reliability parameter is calculated as the difference between the target reliability parameter and the calculated control reliability parameter. By using the method, application data, such as capability of a quantitative control device and energy efficiency of the quantitative weighing device, can be intuitively obtained. This facilitates commissioning, maintenance, and use of the quantitative weighing control device.

6 Claims, 5 Drawing Sheets

(51) Int. Cl.
  *G01G 13/00* (2006.01)
  *G01G 19/414* (2006.01)
  *G01G 23/01* (2006.01)

(56) References Cited

U.S. PATENT DOCUMENTS 9,599,442 B2 * 3/2017 Pearlson ............. F42B 33/0292
2022/0161947 A1 * 5/2022 Petri ................... G01G 15/001

* cited by examiner

METHOD FOR MEASURING ENERGY EFFICIENCY OF A QUANTITATIVE WEIGHING DEVICE

CROSS-REFERENCE TO RELATED APPLICATIONS

This application makes a claim of priority to Chinese application 202010842423.3, filed on 20 Aug. 2020, which is incorporated by reference as if fully recited herein.

TECHNICAL FIELD

The inventive concept relates to the field of weighing devices used to fill packages with a predetermined weight of a product. In particular, it relates to a method for measuring the energy efficiency of a quantitative weighing control device, especially one with two speeds for filling.

BACKGROUND ART

In the packaging art, a quantitative weighing device receives and weighs a predetermined amount of the product to be packaged. Once the quantitative weighing device is "charged" with the product, it discharges the product into an awaiting container and the process is repeated. It is a known practice in this art to use two "charges" to provide the product for the container. As an example, if 100 kg of rice is being weighed for packaging, a typical "fast charge feed flow" would be used to charge about 95 kg of the rice to the quantitative weighing device. The time required to do this is the "control time of fast charging." Fast charging is stopped at the "fast charging off moment." Then, a slower fill rate, the "slow charge feed flow" is used to provide the last 5 kg. The time to do this is the "control time of slow charging" and the slow charging is stopped at the "slow charging off moment." The use of this process is effective to reduce the total charge time, which is a critical variable in how many packages can be filled in a fixed period of time, which is a measure of the efficiency of the device.

In the prior art, the fastest feed time under requirements of a fast charging feed flow, a slow charging feed flow, a device reliability parameter, and a target reliability parameter of a double-speed quantitative weighing control device form the basis for commissioning a quantitative weighing device. These factors are decisive in improving the energy efficiency of the quantitative weighing device. Measurement of the fastest feed time under the requirements of the fast charging feed flow, the slow charging feed flow, the device reliability parameter, and the target reliability parameter of the quantitative weighing device is key for commissioning, maintenance, and use of the quantitative weighing device.

Therefore, there is long felt need for a method for measuring the energy efficiency of a quantitative weighing device in this field, by providing a technical solution for a technical problem that results in improved performance of an instrument.

SUMMARY OF INVENTION

The technical problem to be solved by the inventive concept is the lack of a repeatable and defect-free method in the prior art for measuring energy efficiency of quantitative weighing devices.

The inventive concept solves the above technical problem through the following technical solution in which there is provided a method for measuring the energy efficiency of a quantitative weighing device. The method comprising: recording a control time of fast charging, recording a control time of slow charging, recording a comparison prohibition time, and recording weighing data so as to form a data measurement part; calculating a reliability parameter of the quantitative weighing device, a fast charging feed flow, and a slow charging feed flow using the comparison prohibition time and the control time of slow charging; and calculating a fastest feed time under a condition of a target reliability parameter based on a difference between the target reliability parameter and a calculated control reliability parameter.

According to one embodiment of the inventive concept, the I comparison prohibition time is obtained by: checking whether a slow charging off moment is after a fast charging off moment; and starting from the slow charging off moment and reviewing in reverse chronological order, and taking a slow charging off weight threshold as a standard, a moment at which a weight measurement is greater than or equal to the slow charging off weight threshold is searched in reverse time until the a fast charging off moment is found; if the moment exists, the moment is recorded; and if the moment is not found until the fast charging off moment, the fast charging off moment is recorded, wherein a time from the fast charging off moment to the moment that is recorded is the comparison prohibition time. The comparison prohibition time being a time period during which the slow charging off weight threshold is ignored for purposes of operating the slow charging feed. The slow charging off weight threshold being a threshold where operation of the slow charging feed is normally deactivated.

According to one embodiment of the inventive concept, the method further comprises: performing statistical calculation to obtain averages FtA, StA, HtA, and WtA and standard deviations FtS, StS, HtS, and WtS of data such as Ft[N], St[N], Ht[N], and Wt[N], where Ft represents the control time of fast charging, St represents the control time of slow charging, Ht represents the comparison prohibition time, Wt represents weighing data, and N is a natural number.

According to one embodiment of the inventive concept, a least squares solution of feed capability of the quantitative weighing device is obtained by solving an equation system for the fast charging feed flow and the slow charging feed flow, and said equation system comprises: assuming the fast charging feed flow and the slow charging feed flow as Cf and Cs, respectively, that satisfy the following equation system:

$$Ft[1] \times Cf + St[1] \times Cs = Wt[1];$$

$$Ft[2] \times Cf + St[2] \times Cs = Wt[2];$$

$$\vdots \quad \vdots \quad \vdots$$

$$Ft[N-1] \times Cf + St[N-1] \times Cs = Wt[N-1];$$

$$Ft[N] \times Cf + St[N] \times Cs = Wt[N].$$

According to one embodiment of the inventive concept, calculating the reliability parameter of the quantitative weighing device specifically comprises: the calculated control reliability parameter if the control time of slow charging and the comparison prohibition time follows normal distribution, (StA−HtA)/(StS+HtS).

According to one embodiment of the inventive concept, the fastest feed time specifically comprises: sum of the control time of slow charging and the control time of fast charging under the condition of the target reliability parameter.

The positive improvement effects of the inventive concept are as follows: in the method for measuring the energy efficiency of a quantitative weighing device in the inventive concept, a control time of fast charging, a control time of slow charging, a comparison prohibition time, and a weighing data are obtained through tests, thereby obtaining a fast charging feed flow, a slow charging feed flow, and a device reliability parameter of the quantitative weighing control device through analysis on the basis of the test data, and further obtaining the fastest feed time under the requirements of a target reliability parameter on this basis.

In the method for measuring the energy efficiency of a quantitative weighing device, application data such as the capability of the quantitative control device and the energy efficiency of the device can be intuitively obtained, which facilitates application functions such as commissioning, maintenance, and use of a quantitative weighing control device.

BRIEF DESCRIPTION OF THE DRAWINGS

The inventive concept will be better understood by reference to the accompanying drawings, wherein.

DESCRIPTION OF EMBODIMENTS

To make the above objectives, features and advantages of the inventive concept more apparent and easier to understand, specific implementations of the inventive concept will be described in detail using an embodiment.

Embodiments of the inventive concept will now be described in detail with reference to the accompanying drawings. Reference will now be made in detail to preferred embodiments of the inventive concept, examples of which are illustrated in the accompanying drawings.

Furthermore, although the terms used in the inventive concept are selected from well-known common terms, some of the terms mentioned in the description of the inventive concept may have been selected by the applicant according to his or her determination, and the detailed meaning thereof is described in the relevant section described herein.

Furthermore, the inventive concept must be understood, not simply by the actual terms used but also by the meanings encompassed by each term.

Figure 1:
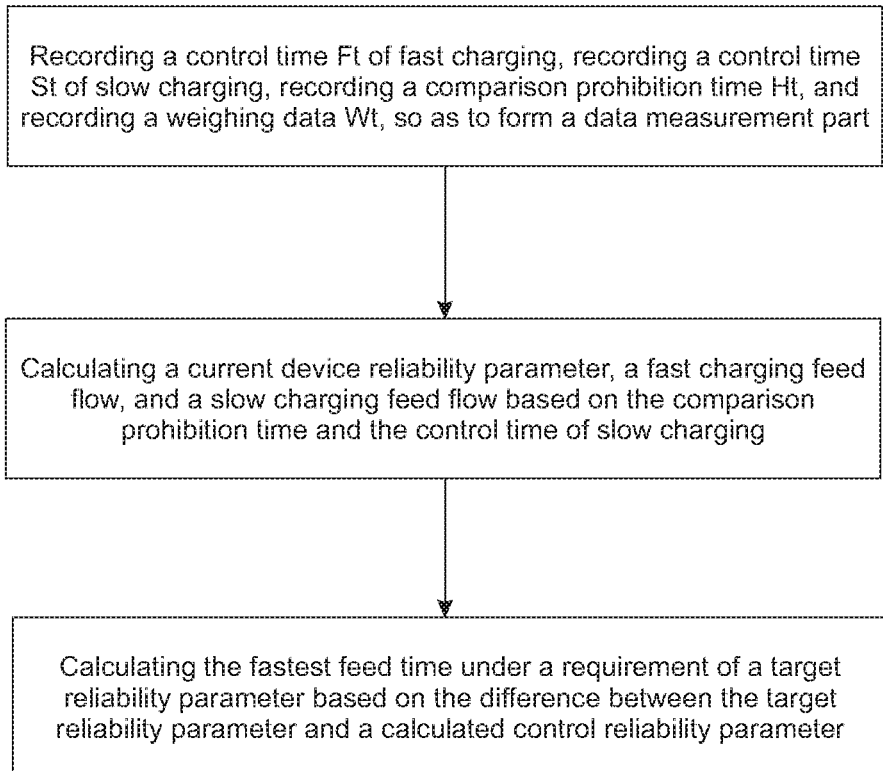
FIG. 1 is a flowchart of a method for measuring the energy efficiency of a quantitative weighing device according to the inventive concept.

The inventive concept discloses a method for measuring the energy efficiency of a quantitative weighing device as shown in FIG. 1, the method comprising: recording a control time of fast charging Ft, recording a control time of slow charging St, recording a comparison prohibition time Ht, and recording weighing data Wt so as to form a data measurement part. The method comprises calculating the reliability parameter of the quantitative weighing device, a fast charging feed flow, and a slow charging feed flow using the comparison prohibition time and the control time of slow charging; and calculating the fastest feed time under a condition of a target reliability parameter based on the difference between the target reliability parameter and a calculated control reliability parameter.

Figure 2:
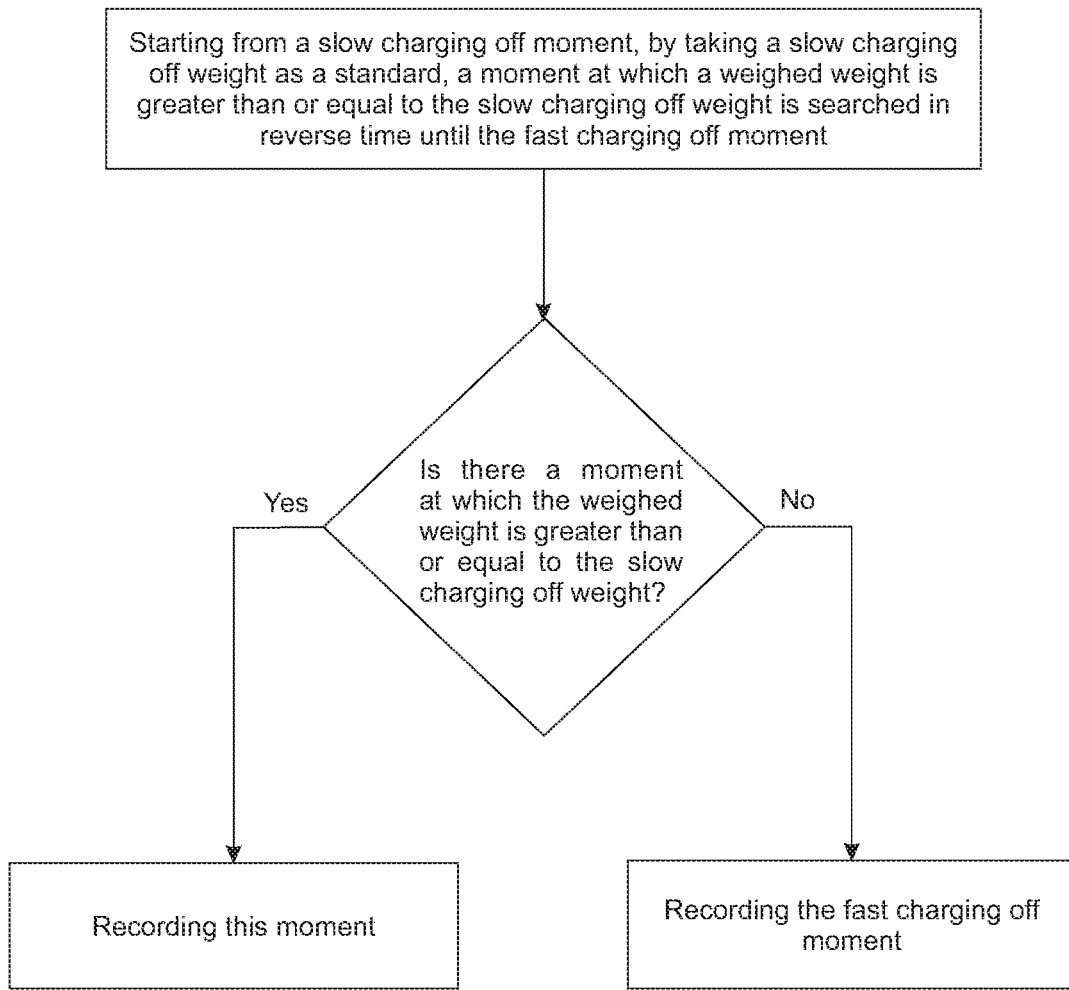
FIG. 2 is a flowchart of obtaining a comparison prohibition time in a method for measuring the energy efficiency of a quantitative weighing device according to the inventive concept.

As shown in FIG. 2, the comparison prohibition time Ht is obtained by checking: whether a slow charging off moment is after a fast charging off moment; and starting from the slow charging off moment and reviewing in reverse chronological order, and taking a slow charging off weight threshold as a standard, a moment at which a weight measurement is greater than or equal to the slow charging off weight threshold is searched in reverse time until the fast charging off moment is found; if the moment exists, the moment is recorded; and if the moment is not found until the fast charging off moment, the fast charging off moment is recorded. A time from the fast charging off moment to the moment that is recorded is the comparison prohibition time. The comparison prohibition time being a time period during which the slow charging off weight threshold is ignored for purposes of activating the slow charging feed.

Backward tracing of the data measurement part is performed in reverse time based on a threshold of a slow charging control off point. When a time length starting from the fast charging off moment to a first position moment coinciding with a weighing curve is smaller than zero, the time is zero, and a batch of data above is obtained through N measurements: Ft[N], St[N], Ht[N], and Wt[N], where Ft represents the control time of fast charging, St represents the control time of slow charging, Ht represents the comparison prohibition time, Wt represents weighing data, the weighing data being the weight for stable weighing after the fast charging and the slow charging are completed, and N is a natural number.

In order to achieve a balance between speed and accuracy, fast charging is usually used to increase speed and slowing charging is usually used to ensure accuracy during quantitative weighing control. The time from the start of fast charging to the end of fast charging is the control time Ft of fast charging. The time from the start of slow charging to the end of slow charging is the control time St of slow charging.

Preferably, the method for measuring the energy efficiency further comprises: performing statistical calculation to obtain averages FtA, StA, HtA, and WtA and standard deviations FtS, StS, HtS, and WtS of data such as Ft[N], St[N], Ht[N], and Wt[N].

Preferably, a least squares solution of the feed capability of the quantitative weighing device is obtained by solving an equation system for the fast charging feed flow and the slow charging feed flow, and the equation system comprises: assuming the fast charging feed flow and the slow charging feed flow as Cf and Cs, respectively, that satisfy the following equation system:

$$Ft[1] \times Cf + St[1] \times Cs = Wt[1];$$

$$Ft[2] \times Cf + St[2] \times Cs = Wt[2];$$

$$\vdots \quad \vdots \quad \vdots$$

$$Ft[N-1] \times Cf + St[N-1] \times Cs = Wt[N-1];$$

$$Ft[N] \times Cf + St[N] \times Cs = Wt[N].$$

The fast charging feed flow and the slow charging feed flow are Cf and Cs is obtained by solving the equation system using the Cramer's rule, and this method is also applicable to a device having three or even more-speeds. The fast charging feed flow Cf is the speed of fast charging, and the slow charging feed flow Cs is the speed of slow charging.

A quantitative control target of the device is WA. For a high-speed quantitative feed system, stable weighing after controlling may usually not be performed i.e. Wt does not exist. The quantitative control target WA is used to replace data of Wt[N], and data of the required fast charging feed flow and slow charging feed flow can still be obtained through calculation.

Preferably, calculating the control reliability parameter Y of the quantitative weighing device specifically comprises that: the control is reliable without overshooting, and assuming that the control time of slow charging St and the comparison prohibition time Ht follows normal distribution, (StA−HtA)/(StS+HtS) characterizes control reliability (an n×σ concept, since assuming that the data follows normal distribution, n*σ is several times of sigma as we usually say, for example, three times of sigma indicates that the control reliability is 99.7%, and this is commonly known in the control field or the field of statistical analysis).

Preferably, for the device reliability calculation part in the method for measuring the energy efficiency of a quantitative weighing device in the inventive concept, the control reliability is calculated using the comparison prohibition time and the control time of slow charging. The fastest feed time is used to evaluate peak energy efficiency of the quantitative weighing device based on the difference between the target reliability parameter and the calculated control reliability parameter.

Here, the target reliability parameter is a preset parameter used for controlling the entire system. The calculated control reliability parameter is a parameter calculated in a system operation process.

The fastest feed time is a time from a time point at which the system starts to work in the initial state to a time point at which the fast charging feed flow and the slow charging feed flow are adjusted based on calculation of a real-time control reliability parameter and the preset target reliability parameter to make the calculated control reliability parameter equal to the preset target reliability parameter.

The fastest feed time under the requirements of the target reliability parameter specifically comprises: first, a preset reliability parameter of a user denoted as K, the control time of slow charging under the control reliability is expressed as:

$$StAx = HtA + K \times (StS + HtS),$$

where K×(StS+HtS) is an inverse calculation of the control reliability.

The difference between control times of slow charging is expressed as:

$$\Delta T = StA - StAx;$$

then the difference between the control times of slow charging is transposed to the control of fast charging, that is:

$$FtAx = FtA + \Delta T \times Cs/Cf,$$

and the energy efficiency of the device is characterized as:

$$DEE = FtAx + StAx$$

The energy efficiency characterization of the quantitative weighing device can be used to calculate a required device energy efficiency evaluation index. For example, the device energy efficiency evaluation index is the maximum number of packages or cans per hour. Certainly, there are a plurality of device energy efficiency evaluation indices. Those provided herein are merely examples and are not used as limitation to the present application.

For the fact that the fastest feed time is used to evaluate peak energy efficiency of the device based on the difference between the target reliability parameter and the calculated control reliability parameter Y, a specific derivation process thereof is applied, which is: assuming that the calculated control reliability parameter is Y, wherein $$Y = (StA - HtA)/(StS + HtS).$$

Statistical analysis is performed on data represented as St[N] and Ht[N] to obtain averages StA and HtA, respectively, and standard deviations StS and HtS, respectively.

The following equations are obtained upon transposition: StA=HtA+Y*(StS+HtS); under the reliability parameter input by the user, StAx=HtA+K*(StS+HtS); where K is the target reliability parameter, StAx is the control time of slow charging, and FtAx is the control time of fast charging; the difference ΔT between the target reliability parameter and the calculated control reliability parameter satisfies ΔT=StA−StAx=(Y−K)*(StS+HtS); and the difference is substituted into the formula of the energy efficiency characterization of the device, that is, DEE=FtAx+StAx.

The target reliability parameter is the minimum requirement of the device. For example, if the baseline (the minimum requirement) of the device is 90%, the reliability parameter satisfying the requirement must be equal to or greater than 90%. The fastest feed time and reliability are inversely related i.e. when reliability rises, the fastest feed time decreases.

According to the above description of the method for measuring the energy efficiency of a quantitative weighing device, the quantitative weighing device used at the application site is an exemplary packaging scale, and the specific method used for measuring the energy efficiency of a quantitative weighing device is described in the following paragraphs.

The exemplary packaging scale is commissioned for operating in conditions that meet the needs of users, and the working efficiency of the system is expressed in terms of its packaging speed, that is, the number of packages handled per hour. However, it is difficult to determine the fastest working efficiency of the current system, thus making it difficult to determine whether the utilization rate of the quantitative weighing device has reached its maximum.

By using the aforementioned method, it is possible to first calculate the current device reliability parameter, the fast charging feed time and the slow charging feed flow, and then calculate the fastest feed time under a requirement of a target reliability parameter. It is also possible to clearly calculate the fastest working efficiency, i.e., number of packages handled per hour, of the current device.

This method enables the customers to operate the quantitative weighing device at full capacity, thereby improving the work efficiency and saving time. At the same time, it also warns the customers about a potential risk of decrease in reliability in case the number of packages per hour exceeds an optimal value.

In summary, in the method for measuring energy efficiency of a quantitative weighing device in the inventive concept, data of a quantitative weighing device is obtained through tests, and the feed capability of the quantitative weighing device is obtained through analysis on the basis of the test data, thereby the energy efficiency of the quantitative weighing device is evaluated. In the method for measuring energy efficiency of a quantitative weighing device, application data such as capability of the quantitative weighing device and energy efficiency of the quantitative weighing device can be intuitively obtained, which facilitates commissioning, maintenance, and use of the quantitative weighing device.

Figure 3:
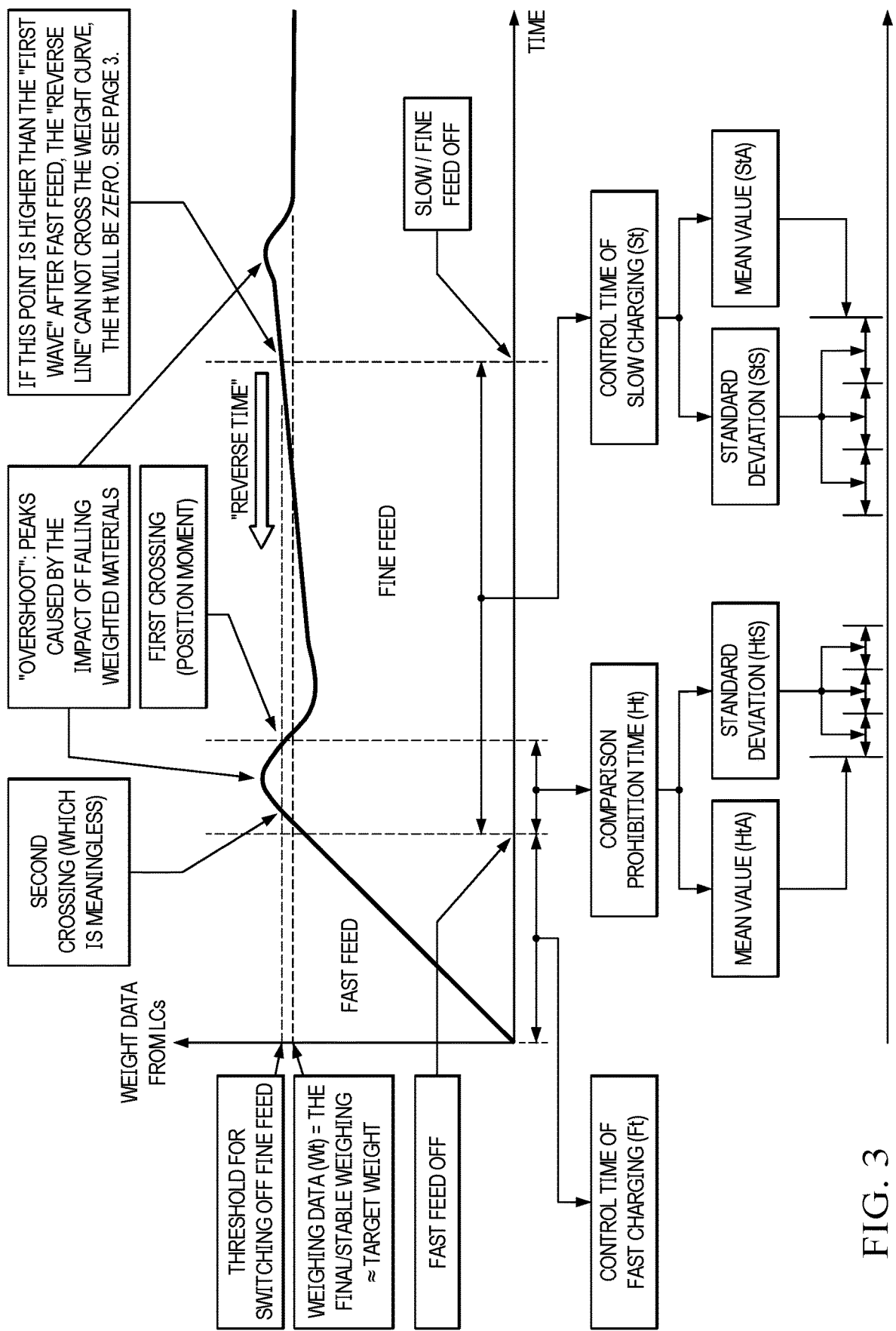
FIG. 3 is a first exemplary timing chart under the methods of FIGS. 1-2.
Figure 4:
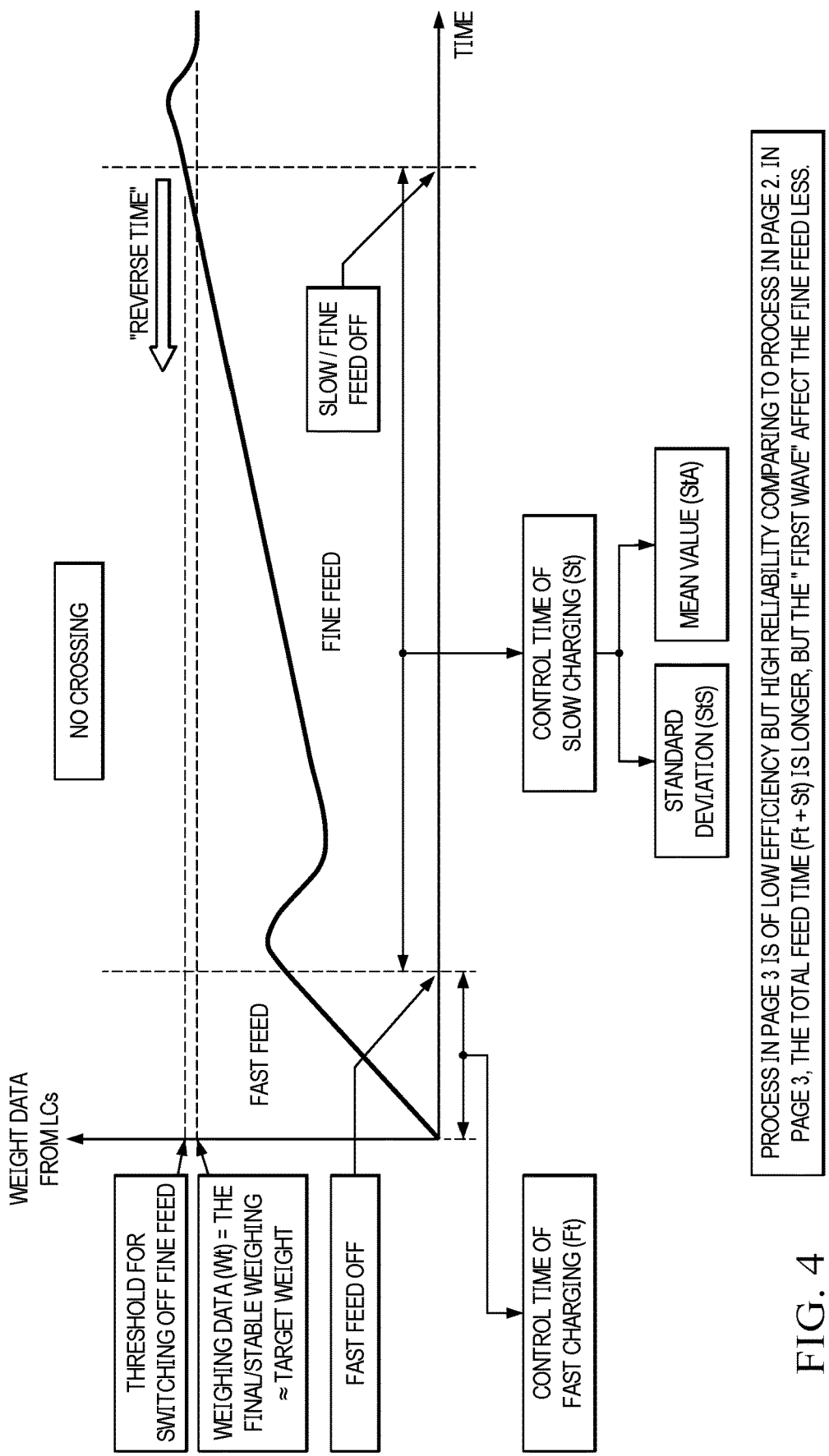
FIG. 4 is a second exemplary timing chart under the methods of FIGS. 1-2.
Figure 5:
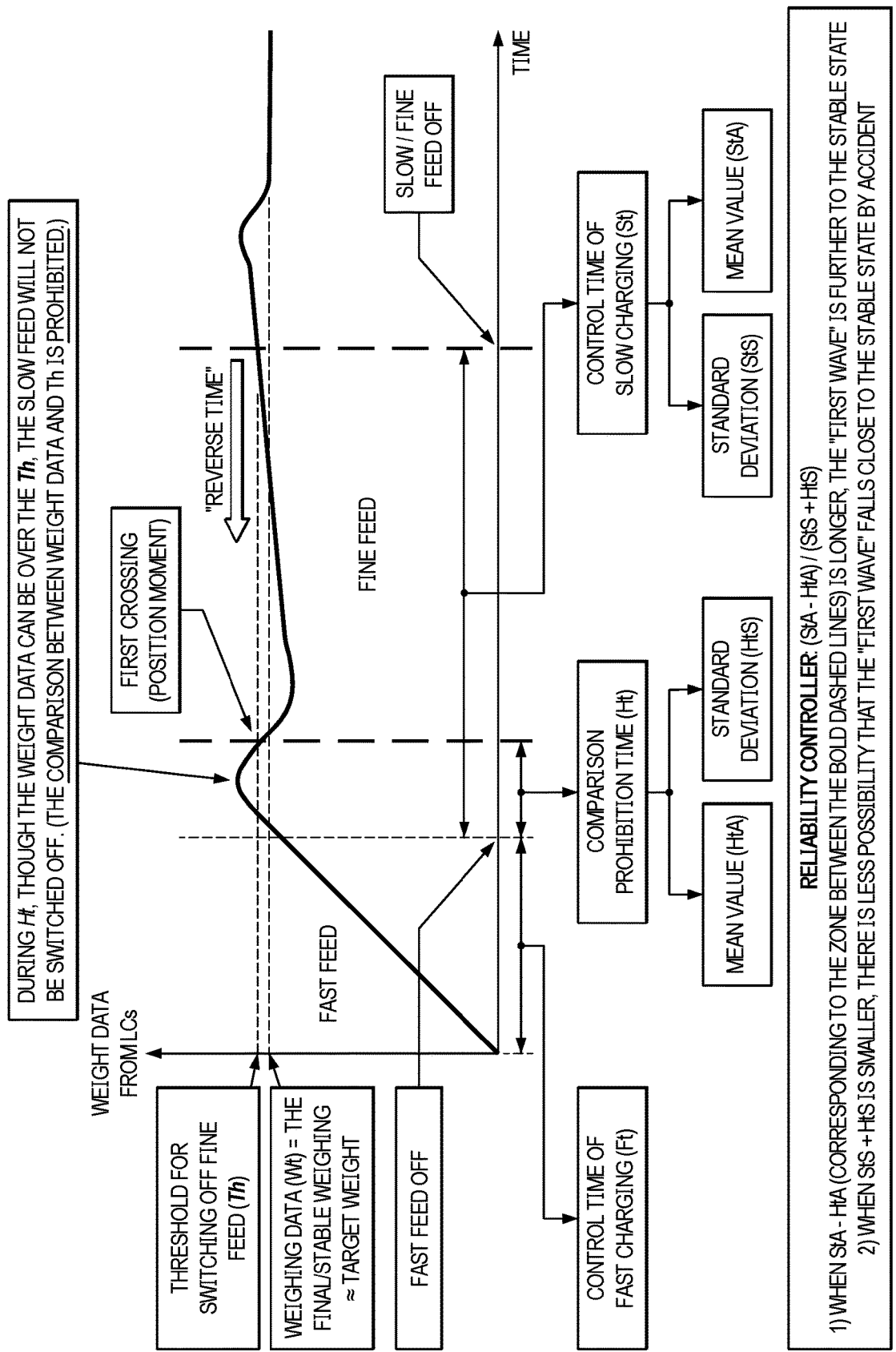
FIG. 5 is a third exemplary timing chart under the methods of FIGS. 1-2.

Exemplary timing charts describing the invention are provided in at least FIGS. 3-5.

Although specific implementations of the inventive concept have been described above, those skilled in the art should understand that these are merely examples, and the scope of protection of the inventive concept is defined by the appended claims. Various alterations or modifications to these implementations can be made by a person skilled in the art without departing from the principle and essence of the inventive concept; however, these alterations and modifications all fall within the scope of protection of the inventive concept.

REFERENCE NUMERALS

Ft control time of fast charging
St control time of slow charging
Ht comparison prohibition time
Wt weighing data
Y control reliability parameter
Cf fast charging feed flow
Cs slow charging feed flow
K reliability parameter of a user
DEE energy efficiency of the device

What is claimed is:

1. A method for measuring and optimizing energy efficiency of a quantitative weighing device of a package charging system, said method comprising:
   operating the package charging system over multiple packaging charging runs, including recording data from the quantitative weighing device over said multiple packaging charging runs, to form a data measurement part comprising:
      a control time of fast charging (Ft),
      a control time of slow charging (St),
      a comparison prohibition time (Ht), and
      weighing data (Wt);
   calculating, at an electronic device associated with the package charging system, using the comparison prohibition time (Ht) and the control time of slow charging (St) and for each of the multiple measurements, feed times for charging a material at the quantitative weighing device, where a slow charging off weight threshold is ignored during the comparison prohibition time (Ht) for purposes of operating the show charging feed:
      a control reliability parameter (Y) of the quantitative weighing device,
      a fast charging feed flow (Cf), and
      a slow charging feed flow (Cs);
   calculating, at the electronic device associated with the package charging system, a fastest feed time of candidate combinations of the fast charging feed flow (Cf) for a first amount of time and the slow charging feed flow (Cs) for a second amount of time where the slow charging off weight threshold is ignored during the comparison prohibition time (Ht) and an absolute difference between a target reliability parameter and the calculated control reliability parameter (Y) under a predetermined threshold; and
   as part of a further packaging charging run, charging the material at the package charging system, including by way of the quantitative weighing device, in accordance with a combination of the candidate combinations resulting in the fastest feed time.

2. The method of claim 1, wherein the comparison prohibition time (Ht) is obtained by:
   checking, at the electronic device associated with the package charging system, whether a slow charging off moment is after a fast charging off moment; and
   searching, at the electronic device associated with the package charging system, in reverse time from a slow charging off moment, for a moment at which a weight measurement is greater than or equal to the slow charging off weight threshold, starting from the slow charging off moment and taking the slow charging off weight threshold as a standard, until a fast charging off moment, such that:
      if the moment is found, this moment is recorded; or
      if the moment is not found, the fast charging off moment is recorded, wherein a time from the fast charging off moment to the moment that is recorded is the comparison prohibition time (Ht).

3. The method of claim 2, further comprising the steps of:
performing, at the electronic device associated with the package charging system, a statistical calculation of the measurement data part, including Ft[N], St[N], Ht[N], and Wt[N], to obtain averages FtA, StA, HtA, and WtA and standard deviations FtS, StS, HtS, and WtS, wherein Ft represents the control time of fast charging, St represents the control time of slow charging, Ht represents the comparison prohibition time, Wt represents the weighing data, and N is a natural number.

4. The method of claim 3, further comprising the steps of:
obtaining, at the electronic device associated with the package charging system, a least squares solution of feed capability of the weighing device by solving an equation system for the fast charging feed flow (Cf) and the slow charging feed flow (Cs), wherein the equation system comprises:
assuming, by way of the electronic device associated with the package charging system, the fast charging feed flow (Cf) and the slow charging feed flow (Cs) satisfy the equation system:

$$Ft[1] \times Cf + St[1] \times Cs = Wt[1];$$
$$Ft[2] \times Cf + St[2] \times Cs = Wt[2];$$
$$\vdots \quad \vdots \quad \vdots$$
$$Ft[N-1] \times Cf + St[N-1] \times Cs = Wt[N-1];$$
$$Ft[N] \times Cf + St[N] \times Cs = Wt[N].$$

5. The method of claim 3, wherein the step of calculating the control reliability parameter (Y) of the quantitative weighing device comprises:
   deriving, at the electronic device associated with the package charging system, the calculated control reliability parameter (Y) as the ratio $$(StA - HtA)/(StS + HtS),$$

if the control time of slow charging (St) and the comparison prohibition time (Ht) follow normal distribution.

6. The method of claim 1, wherein the fastest feed time is defined as a sum of the control time of slow charging (St) and the control time of fast charging (Ft) under the condition of the target reliability parameter.

* * * * *